US010797351B2

(12) United States Patent
Kuroda et al.

(10) Patent No.: US 10,797,351 B2
(45) Date of Patent: Oct. 6, 2020

(54) AMIDE-BASED ELECTROLYTE BATTERY

(71) Applicant: Board of Supervisors of Louisiana State University and Agricultural and Mechanical College, Baton Rouge, LA (US)

(72) Inventors: Daniel Kuroda, Baton Rouge, LA (US); Kristen Fulfer, Baton Rouge, LA (US); Kaylee Theresa Woodard, Baton Rouge, LA (US)

( * ) Notice: Subject to any disclaimer, the term of this patent is extended or adjusted under 35 U.S.C. 154(b) by 33 days.

(21) Appl. No.: 15/966,959

(22) Filed: Apr. 30, 2018

(65) Prior Publication Data

US 2018/0316061 A1    Nov. 1, 2018

Related U.S. Application Data

(60) Provisional application No. 62/492,661, filed on May 1, 2017.

(51) Int. Cl.
*H01M 10/0569* (2010.01)
*H01M 10/0568* (2010.01)
*H01M 10/0525* (2010.01)

(52) U.S. Cl.
CPC ... *H01M 10/0569* (2013.01); *H01M 10/0525* (2013.01); *H01M 10/0568* (2013.01); *H01M 2300/0037* (2013.01)

(58) Field of Classification Search
CPC ............. H01M 10/05; H01M 10/0525; H01M 10/0568; H01M 10/0569
See application file for complete search history.

(56) References Cited

U.S. PATENT DOCUMENTS

2011/0183200 A1* 7/2011 Odani .................. H01M 4/131
429/200
2017/0084953 A1* 3/2017 Smith ............... H01M 10/0567

* cited by examiner

*Primary Examiner* — Karie O'Neill Apicella
(74) *Attorney, Agent, or Firm* — Thomas|Horstemeyer, LLP; Stephanie Davy-Jow

(57) ABSTRACT

An energy storage apparatus is described and claimed herein comprising, generally, a battery housing enclosing a negative electrode, a positive electrode, and an electrolyte, wherein the electrolyte comprises a salt dissolved in either an amide-based solvent. In various embodiments, the amide-based solvent is a tertiary amide. Moreover, the energy storage apparatus may be a lithium ion battery that comprises an electrolyte with a lithium salt dissolved in a tertiary amide.

6 Claims, 8 Drawing Sheets

FIGURE 7

|  | Conductivities (at T=20 °C, reported in mS/cm) | |
|---|---|---|
| Amide Solvent | Neat Solvent | Electrolyte (1M LiTFSI) |
| DMI | 0.0 | 3.4 |
| TMU | 0.0 | 3.1 |

FIGURE 8

| Electrolyte | Viscosity (T=25°C, reported in cP) |
|---|---|
| 1M LiTFSI in DMI | 11.0 |
| 1M LiTFSI in TMU | 12.1 |

AMIDE-BASED ELECTROLYTE BATTERY

CROSS REFERENCE TO RELATED APPLICATIONS

This application claims priority to the provisional application U.S. Application No. 62/492,661, filed on May 1, 2017, titled "Amide-Based Electrolyte Battery".

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

DESCRIPTION OF THE DRAWINGS

The drawings constitute a part of this specification and include exemplary embodiments and examples of the Amide-Based Electrolyte Battery, which may be embodied in various forms. It is to be understood that in some instances, various aspects of the invention may be shown exaggerated or enlarged to facilitate an understanding of the invention. Therefore the drawings may not be to scale.

FIG. 7 shows the room temperature conductivity of the amide-based electrolytes.

FIG. 8 shows the room temperature viscosity of the amide-based electrolytes.

TECHNICAL FIELD

Figure 1:
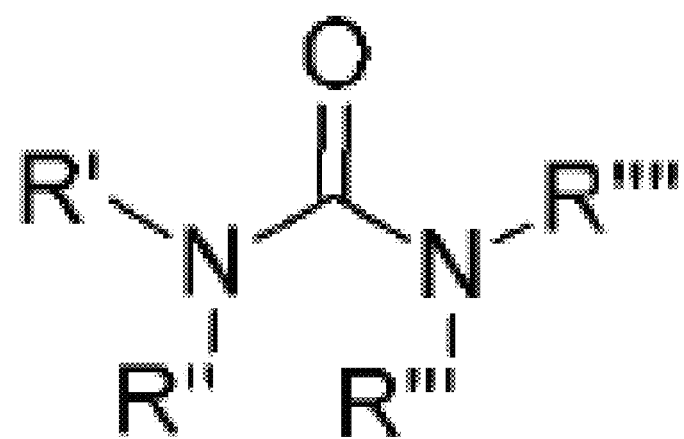
FIG. 1 shows the generic structure of a tertiary amide wherein the R-groups may be the same or different. Additionally, depending on the embodiment, two or more R-groups may or may not connect to form a cyclic structure.
Figure 2:
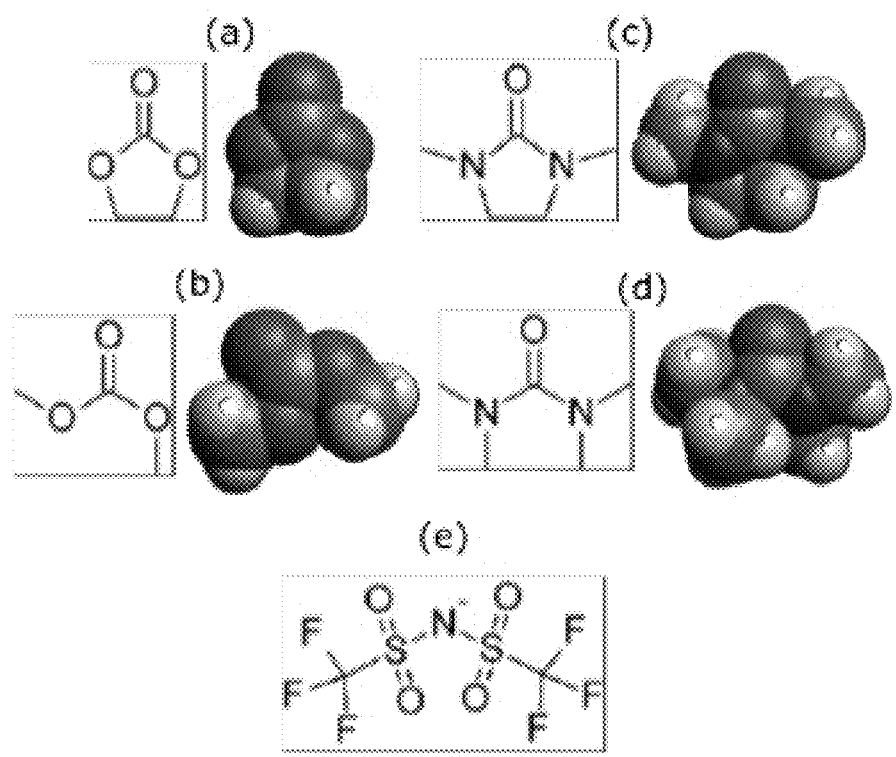
FIG. 2 shows the structure and space filled model of several electrolytes that can be employed in a lithium battery, showing the following molecules: (a) ethylene carbonate, (b) 1,3-dimethyl-2-imidazolidinone, (c) dimethyl carbonate, (d) tetramethylurea, and (e) lithium bis(trifluoromethane) sulfonimide.

The instant invention is directed to a means of storing energy. The invention relates generally to a rechargeable lithium ion battery. More particularly, the instant invention is directed to a lithium battery that employs an amide electrolyte for additional safety benefits over the prior art.

DISCLOSURE OF THE INVENTION

Background

As energy demands continue to expand, finding safe and efficient means of storing energy is becoming a higher priority. Lithium ion batteries currently serve most portable energy storage needs, but pose significant safety risks and efficiency issues.

Conventional lithium ion batteries consist of a positive electrode (e.g. $LiCoO_2$ with aluminum foil), a negative electrode (e.g. graphite with copper foil), and an electrolyte medium. Current commercial lithium ion energy storage technologies utilize electrolyte which are composed of a lithium salt (usually lithium hexafluorophosphate ($LiPF_6$) or lithium bis(trifluoromethanesulfonyl)imide (LiTFSI)) and a combination of organic carbonate solvents (usually a mixture of a linear carbonate and a cyclic carbonate in a 7:3 ratio by volume). Linear carbonates include but are not limited to: dimethyl carbonate, ethyl methyl carbonate, diethyl carbonate, and their fluorinated derivatives. Cyclic carbonates include but are not limited to: ethylene carbonate, propylene carbonate, butylene carbonate, and their fluorinated derivatives.

As previously indicated, conventional lithium ion batteries pose severe safety hazards, particularly due to the use of carbonate-based electrolytes. Organic carbonate solvents are proficient at maintaining a charge due to their intrinsically high dielectric constants. This has led to their widespread usage in lithium ion batteries. However, the organic carbonate solvents used are also highly flammable and exhibit low heat tolerance. For instance, the flash points of some organic carbonates commonly used in lithium ion battery electrolytes are as listed: dimethyl carbonate 16° C., ethyl methyl carbonate 23° C., diethyl carbonate 25° C., ethylene carbonate 143° C., propylene carbonate 116° C., and butylene carbonate 135° C. The linear organic carbonates, which compose 70% of the solvent mixture by volume have flash points at or below room temperature, making lithium ion batteries hazardous, particularly when dropped, damaged, or operated at elevated temperatures. Aside from the obvious hazards that can arise, these attributes also decrease the efficiency of lithium ion batteries as they are not capable of operating safely over a wide temperature range.

The instant invention seeks to solve both of these dilemmas by creating a novel lithium ion battery wherein the organic carbonate solvents are replaced with tertiary amide solvents. It has been found that doing so provides a solvent that has competitive dielectric constants, but with a significant increase in flash point, thereby providing a safer battery that can be employed across a much larger temperature gradient.

SUMMARY

The disclosed invention presents an novel lithium ion battery that utilizes tertiary amide solvents to increase the safety of the battery without sacrificing efficacy. In one embodiment, the Amide-Based Electrolyte Battery comprises a battery housing with a negative electrode, a positive electrode, and an electrolyte, for which the electrolyte comprises a salt dissolved in either a single tertiary amide solvent, a mixture of multiple tertiary amide solvents, or a mixture of one or more tertiary amide solvents with one or more organic carbonate solvents.

In additional embodiments, the battery is a lithium ion battery and the positive electrode comprises lithium.

In alternate embodiments, the battery is a lithium ion battery and the salt comprises lithium.

In additional embodiments, the battery is a lithium ion battery and at least one of the positive electrode or the salt comprises lithium.

In alternate embodiments, the amide selected has a higher flash point than organic carbonates.

In alternate embodiments, the solvent comprises a tertiary amide.

In related embodiments, the solvent can comprise a tertiary amide that can be linear, cyclical, or comprise a combination of linear and cyclical tertiary amides.

In yet additional, related embodiments, the solvent comprises at least one tertiary amide selected from the group comprising amide N-methyl urea; N,N'-dimethyl urea; 1,1-dimethyl urea; Tetramethyl urea; N-ethyl urea; 1,3-diethyl urea; 1,1-diethyl urea; N-[(trimethylsilyl)methyl] urea; 1-[3-(trimethoxysilyl)propyl]urea; 1,3-dimethyl-2-imidazolidinone; 2-imidazolidinone; 1,3-dimethyl-3,4,5,6-tetrahydro-2(1H)-pyrimidinone; 1,3-dihydro-2H-imidazol-2-one; 1-isopropyl-2-imidazolidinone; and 1-methyl-2-imidazolidinone.

DETAILED DESCRIPTION

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Furthermore, the described features, structures, or characteristics may be combined in any suitable manner in one or more embodiments. In the following description, numerous specific details are provided, such as examples of amides, imides, positive electrodes, and negative electrodes. For example, an exemplary embodiment of a battery is discussed herein to be a lithium ion battery due to its familiarity in the industry. One skilled in the relevant art will recognize, however, that an Amide-Based Electrolyte Battery may be practiced without one or more of the specific details, or with other methods, components, materials, and so forth. In other instances, well-known structures, materials, or operations are not shown or described in detail to avoid obscuring aspects of the invention.

A battery means is provided herein comprising, generally, a battery housing, a positive electrode, a negative electrode, and an amide-based electrolyte medium, wherein the positive electrode and negative electrode are housed within the housing, but spatially separated by the electrolyte medium.

For the purposes of describing the instant invention, a comparison is drawn to the conventional lithium ion battery. It is readily understood that this comparative embodiment is provided for illustrative purposes and is in no way intended to be limiting. To the contrary, it is readily appreciated that the use of an amide-based electrolyte can be employed with numerous types of batteries that employ a positive electrode and negative electrode that must be bridged by an electrolyte.

As previously indicated, Lithium ion batteries consist of a positive electrode (e.g. $LiCoO_2$ with aluminum foil), a negative electrode (e.g. graphite with copper foil), and an electrolyte medium. The electrolyte medium is typically comprised of a lithium salt and one or more organic carbonate solvents. The organic carbonates, particularly those of cyclic structure, have particularly high dielectric constants, with ethylene carbonate (EC) having a dielectric constant of 95.3 and dimethyl carbonate (DMC) having a dielectric constant of 3.08, both at 25° C., leading to the historically widespread use of carbonate solvents in lithium ion battery electrolytes.

The present invention replaces the organic carbonate solvents in lithium ion battery electrolytes with amide-based electrolytes such as tertiary amide solvents. It has been found that doing so increases the safe temperature operation spectrum without sacrificing the conductivity to an unacceptable level. It is conceivable that numerous amide-based electrolytes can be employed. Notable commercially available tertiary amides include N-methyl urea (melting point 96° C., flash point not available); N,N'-dimethyl urea (157° C.); 1,1-dimethyl urea (melting point 178° C., flash point not available); Tetramethyl urea (75° C.), i.e., TMU; N-ethyl urea (93° C.); 1,3-diethyl urea (melting point 112° C., flash point not available); 1,1-diethyl urea (melting point 69° C., flash point not available); N-[(trimethylsilyl)methyl] urea (melting point 115° C., flash point not available); 1-[3-(trimethoxysilyl)propyl]urea (99° C.); 1,3-dimethyl-2-imidazolidinone (95° C.); 2-imidazolidinone (melting point 129° C., flash point not available); 1,3-dimethyl-3,4,5,6-tetrahydro-2(1H)-pyrimidinone (120° C.); 1,3-dihydro-2H-imidazol-2-one (not available); 1-isopropyl-2-imidazolidinone (not available); and, 1-methyl-2-imidazolidinone (not available).

Replacing the ethereal oxygens of the carbonates with amide groups does not result in large loss of dielectric constant, with 1,3-dimethyl-2-imidazolidinone (DMI) having a dielectric constant of 37.6 at 25° C. and tetramethylurea (TMU) having a dielectric constant of 24.45 at 20° C. However, from a safety perspective, the amide derivatives have a significant increase in flash point and thus an increase in safety. The typical commercially used lithium ion battery electrolyte has a flash point of ~28° C. while DMI has a flash point of 120° C. and TMU has a flash point of ~75° C.

Tertiary amides exhibit dielectric constants similar to carbonates, while evidencing more favorable flashpoints. In some ways, the structures share similarities to carbonates; yet, their differences are notable and would suggest that tertiary amides would not be a good substitute. Turning to FIG. 1, Tetramethylurea (TMU) and DMI, the tertiary amide most analogous of DMC and EC respectively, are shown. The space-filled models show that the carbonyl oxygens of the carbonates are much less crowded and thus more available to bind with the lithium ion ($Li^+$), whereas in the tertiary amides the additional methyl groups crowd the oxygen potentially making it less available to bind with $Li^+$. Furthermore, the methyl groups of dimethyl carbonate (DMC) have the ability to rotate, since the cis/trans energy barrier has been reported to be small. However, in the linear tertiary amide, TMU, each nitrogen has two methyl groups, inhibiting rotation and making the linear amide much more rigid than the linear carbonate. Thus, the change in structure of the solvent from carbonates to amides would be expected to have structural, and potentially dynamical, effects on the electrolyte solution. Nevertheless, experiments have demonstrated that amide-based electrolytes can serve as a useful alternative to carbonate catalysts in batteries, providing similar functionality with greater versatility.

Example

Electrolytes formed from lithium bis(trifluromethane) sulfonamide (LiTFSI) in DMI and TMU were characterized using cyclic voltammetry, conductivity, viscosity, and Fourier transform infrared spectroscopy (FTIR) measurements.
Experimental Methods.

The following experimental methods were employed:
Solution Preparation:

LiTFSI 98% pure from Acros Organics, LiPF$_6$ 99% pure from Acros Organics, TMU 99% pure from Alfa Aesar, and DMI 98% pure from Alfa Aesar were used without further purification. The carbonyl stretch region of the infrared spectra of both DMI and TMU were verified to be free of Fermi resonances. Electrolyte solutions in each of DMI and TMU were prepared with LiPF$_6$ and LiTFSI at varying concentrations.

Sample cells for FTIR were comprised of <5 μL of electrolyte between two CaF$_2$ windows without spacer. All solutions and sample cells were prepared in a N$_2$-filled glovebox in order to prevent water contamination.

Fourier Transform Infrared Spectroscopy (FTIR):

FTIR experiments were performed on a Bruker Tensor 27 equipped with a liquid nitrogen cooled MCT detector resulting in a spectral resolution of 0.5 cm$^{-1}$. Reported spectra were averaged over 40 scans. FTIR were also collected in Attenuated Total Reflectance mode (ATR-FTIR) using a Bruker Tensor 27 equipped with a Pike diamond/ZnSe ATR crystal and DTGS detector with a spectral resolution of 4 cm$^{-1}$. ATR-FTIR were averaged over 16 scans. FTIR data were modeled with Voigt profiles within the OrginLab software.

Cyclic Voltammetry:

Cyclic voltammetry experiments were performed in an N2-filled glovebox using a three-electrode setup comprising a glassy carbon working electrode, a platinum counter electrode, and a silver (Ag/Ag$^+$) reference electrode. The reference electrode was calibrated with a ferrocene standard after each experiment.

Conductivity:

Conductivity measurements were performed with a YCI 3200 series conductivity instrument with a 3253 conductivity cell. In order to minimize water contamination during measurements, the hydrated electrodes of the cell were dried under flowing nitrogen gas to remove water not directly absorbed to the electrodes. Between measurements, the probe was rinsed with ethanol followed by water to remove the electrolyte solution and then soaked in water to maintain proper hydration of the conductivity cell. A 0.1 M aqueous NaCl solution was used to check the calibration of the conductivity probe.

Viscosity:

Room temperature dynamic viscosity measurements were collected on a Brookfield LVDV-II+Pro Cone/Plate viscometer equipped with a CPE-40 cone spindle.

Results

Figure 3:
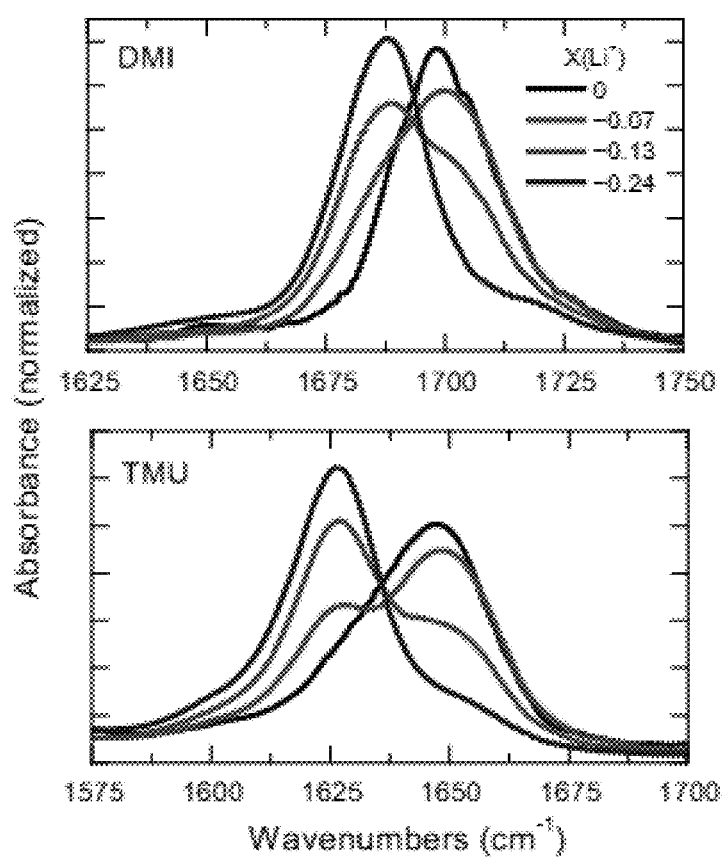
FIG. 3 is a graph showing Concentration dependent FTIR spectra for LiTFSI in (top) DMI and (bottom) TMU. Absorbance spectra were normalized to the sum of the carbonyl stretch region.

In order to study the structure of the Li+ solvation shell, concentration dependent FTIR spectra were collected for each of the amide-based electrolytes. Turning to FIG. 3, the FTIR spectra of the amide-based electrolytes show two bands in the carbonyl stretch region. Before the lithium salt is added, there is only one band in the carbonyl stretch region of the infrared spectrum; this band is denoted as the free band. The free carbonyl stretch band of TMU is excitonic due to ordering of the neat TMU solvent. The low frequency C=O stretch band grows with increasing Li+ concentration, and is thus denoted as the coordinated band, analogous to the coordinated C=O stretch which is apparent in the LiPF$_6$/carbonate electrolytes.

There are many spectral similarities in the C=O stretch region between the amide and carbonate electrolytes; however, there are also substantial differences. For instance, the spacing between the free and coordinated bands was ~32 cm$^{-1}$ for both linear and cyclic carbonates; conversely, the free and coordinated bands of the amide electrolytes are much closer together. Specifically, the spacing between the bands is ~17 cm$^{-1}$ for the cyclic amide and ~25 cm$^{-1}$ for the linear amide. Furthermore, while the cyclic carbonate presented much broader FTIR bands than its linear analogue, the cyclic and linear amides show very similar bandwidths of ca. 25 cm$^{-1}$ full width at half maximum, FWHM. Lastly, the free carbonyl stretch band is nearly depleted at high Li$^+$ concentration, an effect which was not seen in the carbonate electrolytes. The presence of two bands in the C=O stretch region of the FTIR for the amide electrolytes is a good indicator that the amides solvate the lithium ion tetrahedrally, similar to the carbonate molecules.

Though the amides appear to solvate Li$^+$ tetrahedrally, there are spectral differences in the FTIR and 2DIR data which may indicate differences in the Li$^+$ solvation structures. For instance in the concentration dependent FTIR data, the free and coordinated bands are much closer together in frequency for the amide solvents than for the carbonate solvents. It has been previously shown that as the interaction energy increases, the separation of the free and coordinated band also increases. Thus, this indicates that both of the amides have a weaker interaction with the Li$^+$ than the carbonate molecules, and furthermore, the cyclic amide has a weaker interaction with Li$^+$ than its linear analogue. This weaker interaction likely indicates that the solvating amide molecules have a larger Li$^+$—O distance on average.

Figure 4:
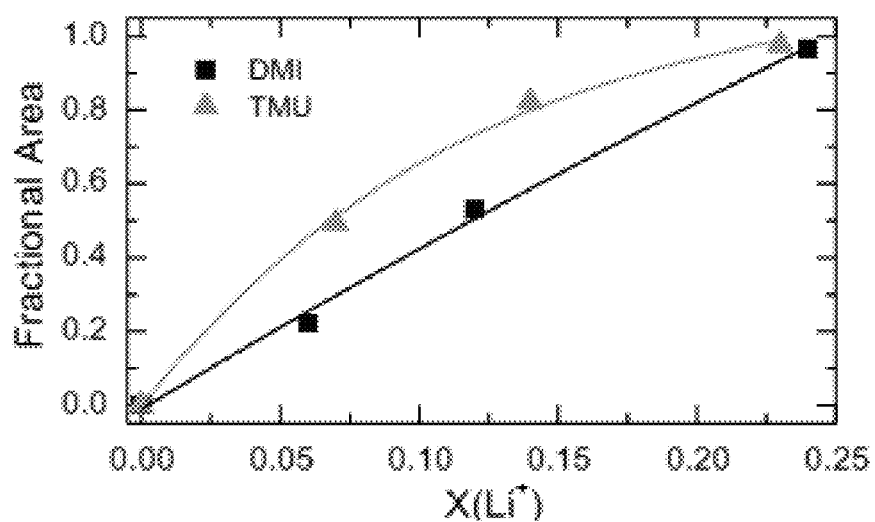
FIG. 4 shows fractional area of the $Li^+$-coordinated carbonyl stretch as a function of $Li^+$ concentration in each of DMI and TMU.

The FTIR data showed that the free carbonyl band is almost completely depleted at high lithium ion concentration, X(Li$^+$)~0.24 for the DMI and TMU electrolytes. This is also apparent in the fractional area of the coordinated band with concentration as shown in FIG. 4. At high concentration, the fractional area of the coordinated carbonyl stretch approaches one for each of the amide electrolytes. At comparable Li$^+$ concentration, the coordinated band fractional area of the cyclic and linear carbonates were reported at 0.9 and 0.8, respectively. Further, the fractional area of the coordinated bands of the amide electrolytes are higher at lithium salt concentrations of ~1M than their carbonate analogues. A high fractional area of the Li+-coordinated band was previously shown with DFT calculations to indicate Li$^+$~O=C angles closer to 180°. Thus, the FTIR data indicates that the amides form a more tetrahedral (with respect to the Li$^+$~O=C angle) solvation complex than the carbonates. The coordinated band fractional areas were modeled with an exponential growth function of the form: y0(1−e$^{(-X(Li^+)/C)}$), where C is the characteristic growth of the coordinated fractional area with Li$^+$ concentration. Both the cyclic and linear amides give similar characteristic growths of the coordinated band as their linear counterparts. The ability of the free carbonyl stretch to be depleted at high Li$^+$ concentration also may indicate that the amide solvents do not solvate the TFSI$^-$ anion as well as the carbonate solvents, since the molecules participating in the solvation shell of the anion should appear in the free band. Alternatively, this could indicate that LiTFSI is able to participate in the solvation complex of Li$^+$ at high concentration. Further, an electrolyte was formed with the lithium salt, LiClO$_4$, in a mixture of butylene carbonate and tetramethylurea (TMU), and it was seen from the FTIR that all of the carbonate molecules remained free in solution and only the TMU interacted with Li$^+$. Thus, it appears that the amides, TMU in particular, solvated Li$^+$ as well and possibly better than carbonate solvents.

Figure 5:
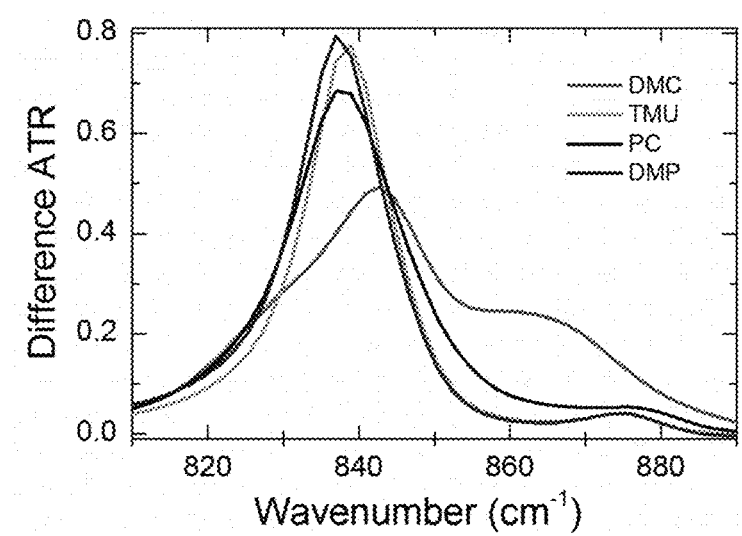
FIG. 5 shows the FTIR-ATR spectra of the P—F stretch modes for $LiPF_6$ in TMU and $LiPF_6$ in dimethyl carbonate.

Turning to FIG. 5, it appears that the amide solvents solvate the PF$_6^-$ anion, the anion of another commonly used lithium salt, better than linear carbonate molecules. It has been shown previously that the P—F stretch modes of the PF$_6^-$ anion show a single band around 840 cm$^{-1}$ when the PF$_6^-$ anion is well-solvated, and three bands at 830, 840, and 865 cm$^{-1}$ when the PF$_6$– anion is not well-solvated and thus forms solvent separated ion pairs with the Li$^+$. Using LiPF$_6$ as the lithium salt, electrolytes were prepared with two carbonates: dimethyl carbonate, which is linear, and propylene carbonate, which is cyclic, and with two amides: TMU, which is linear, and 1,3-dimethyl-3,4,5,6-tetrahydro-2(1H)-pyrimidinone (DMP), which is cyclic. All linear carbonates, though only dimethyl carbonate is shown, present three P—F stretching bands, indicating that the linear carbonates do not solvate the PF$_6^-$ anion well. However, both the linear and cyclic amide show a single P—F stretching band, indicating that the amides are good solvents both for the cation (Li$^+$) and the anion (PF$_6^-$, in this case).

Another noticeable spectral feature in the FTIR data (FIG. 3) for the amide electrolytes is that the FHWM of the coordinated bands are comparable for the cyclic and linear solvents at any given LiTFSI concentration over the range measured. This is in stark contrast with the carbonates, where the FWHM of the coordinated band of the cyclic carbonates was nearly double that of the linear carbonates at any given Li$^+$ concentration. Furthermore, the FWHM of the coordinated bands in both of the amide-electrolytes is very similar to that of the linear carbonates. It has been suggested from NMR and infrared studies that a second solvation shell of cyclic carbonates may be capable of intercalating into the primary solvation complex around Li$^+$, while there is no evidence of the linear carbonate doing this. This may occur because of the size and rigidity of the cyclic carbonates. Conversely, as shown in FIG. 1, both the linear and cyclic amides have additional methyl groups flanking the carbonyl group and increasing the size of the amides relative to their carbonate analogues. These features may inhibit the amides from the ability to intercalate into the solvation shell as evidenced by the narrower bandwidth of the coordinated carbonyl stretch.

An important characteristic of a battery electrolyte is its electrochemical window, or the voltage range over which the electrolyte is stable. The electrochemical windows of the electrolytes formed from 1M LiTFSI in DMI and 1M LiTFSI in TMU were determined from cyclic voltammetry experiments to be 4.1 V and 4.3 V, respectively, as shown in FIG. 4. Currently used lithium-ion electrolytes have an electrochemical window of approximately 4.5 V, meaning that the amide-based electrolytes tested in this example are capable of operating under similar conditions as the electrolyte which are currently used.

Figure 6:
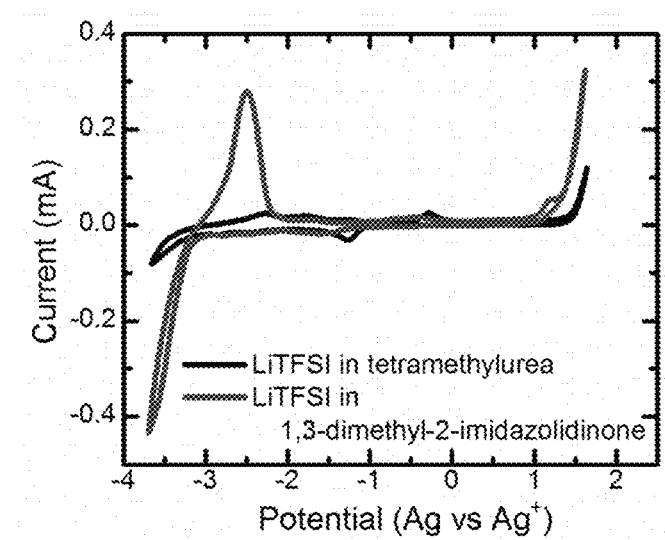
FIG. 6 shows the cyclic voltammagram of 1M LiTFSI in DMI and 1M LiTFSI in TMU.

Two other common metrics for the physical characterization of electrolytes are conductivity, the ability of charge to move through the solution, and viscosity. Shown in FIGS. 5 and 6 are the measured room-temperature conductivities and viscosities for the two amide-based electrolytes. Both amide-based electrolytes were measured to have conductivities >3 mS/cm. While these conductivities are still low compared to the ~10 mS/cm achieved by the current carbonate-based electrolytes, conductivity has been shown to be sensitive to the salt composition, solvent composition, salt concentration, and temperature. For instance, by replacing the LiTFSI salt with LiPF$_6$, the conductivity in TMU was increased to 5.6 mS/cm. Thus, it is believed that the conductivity of amide-based electrolytes may be improved by finding the optimum electrolyte composition.

The experiments show that the amide-based electrolytes present a tetrahedral solvation complex around Li$^+$, which is less rigid than that presented by cyclic carbonates and of similar rigidity to that presented by the electrolyte formed by linear carbonates. In short, the Li$^+$-amide-based electrolytes provided conductivities less than those observed for commercial lithium ion electrolytes, i.e., 10.4 mS/cm. However, this tradeoff in conductivity is balanced with a much larger flash point and, thus, a much larger temperature safe operating zone. Furthermore, it has also been shown that the conductivity of the electrolyte can be increased by a modification of the salt—for example, when the salt is changed from LiTFSI to LiPF$_6$. Thus, it is believed that the conductivity can be recuperated by modifying the salts. Furthermore, the electrochemical windows of the amide-based electrolytes is very similar to that of the currently used carbonate-based electrolytes, indicating that the amide-based electrolytes may serve as significantly safer alternatives to the carbonate-based electrolytes.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. References are made in the text to exemplary embodiments of an amide based electrolyte battery, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the Amide-Based Electrolyte Battery may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change to the basic function to which it is related.

We claim:

1. An energy storage apparatus comprising:
    a battery housing;
    a negative electrode;
    a positive electrode; and
    an electrolyte comprising a salt that has been dissolved in an amide-based solvent, wherein the amide-based solvent is selected from one or more of the following: N-methyl urea; N,N'-dimethyl urea, 1,1-dimethyl urea, N-ethyl urea, 1,3-diethyl urea, 1,1-diethyl urea, N-[(trimethylsilyl)methyl] urea and 1-[3-(trimethoxysilyl)propyl]urea.

2. The energy storage apparatus of claim 1, wherein the amide-based solvent comprises:
    a solvent comprising at least one of methyl urea; N,N'-dimethyl urea, 1,1-dimethyl urea, N-ethyl urea, 1,3-diethyl urea, 1,1-diethyl urea, N-[(trimethylsilyl)methyl] urea and 1-[3-(trimethoxysilyl)propyl]urea; and
    a solvent comprising at least one organic carbonate, wherein the one or more of N,N'-dimethyl urea, 1,1-dimethyl urea, N-ethyl urea, 1,3-diethyl urea, 1,1-diethyl urea, N-[(trimethylsilyl)methyl] urea and 1-[3-(trimethoxysilyl)propyl]urea selected has a higher flash-point than the one or more selected organic carbonates.

3. The energy storage apparatus of claim 1, wherein the apparatus is a lithium ion battery.

4. The energy storage apparatus of claim 1, wherein apparatus is a lithium ion battery and the positive electrode comprises lithium.

5. The energy storage apparatus of claim 1, wherein the apparatus is a lithium ion battery and the salt comprises lithium.

6. The energy storage apparatus of claim 1 wherein the apparatus is a lithium ion battery and at least one of the positive electrode or the salt comprises lithium.

* * * * *